United States Patent
Martin San Juan (10) Patent No.: US 7,031,337 B2
(45) Date of Patent: Apr. 18, 2006

(54) DATA PROCESSING APPARATUS AND SLAVE INTERFACE MECHANISM FOR CONTROLLING ACCESS TO A SLAVE LOGIC UNIT BY A PLURALITY OF MASTER LOGIC UNITS

(75) Inventor: Martin Martin San Juan, Cambridge (GB)

(73) Assignee: ARM Limited, Cambridge (GB)

(*) Notice: Subject to any disclaimer, the term of this patent is extended or adjusted under 35 U.S.C. 154(b) by 920 days.

(21) Appl. No.: 09/845,329

(22) Filed: May 1, 2001

(65) Prior Publication Data

US 2002/0006134 A1    Jan. 17, 2002

(30) Foreign Application Priority Data

Jul. 17, 2000    (GB) .................................... 0017531

(51) Int. Cl.
  H04J 3/02    (2006.01)
  G06F 13/00   (2006.01)
  G06F 15/16   (2006.01)

(52) U.S. Cl. .................... 370/462; 710/110; 709/211
(58) Field of Classification Search ............... 370/438, 370/439, 445, 447, 461, 462; 709/208, 211; 710/110, 305, 313
See application file for complete search history.

(56) References Cited

U.S. PATENT DOCUMENTS

| 4,677,566 | A | * | 6/1987 | Whittaker et al. | 700/295 |
| 4,868,741 | A | * | 9/1989 | Gula et al. | 710/113 |
| 5,544,332 | A | * | 8/1996 | Chen | 710/108 |
| 5,568,617 | A | * | 10/1996 | Kametani | 710/100 |
| 5,596,729 | A | * | 1/1997 | Lester et al. | 710/309 |
| 5,640,517 | A | * | 6/1997 | Parks et al. | 710/105 |
| 5,655,082 | A | * | 8/1997 | Umekita et al. | 709/213 |
| 5,708,784 | A | * | 1/1998 | Yanai et al. | 710/119 |
| 5,717,873 | A | * | 2/1998 | Rabe et al. | 710/110 |
| 5,761,450 | A | * | 6/1998 | Shah | 710/107 |
| 5,943,483 | A | * | 8/1999 | Solomon | 710/107 |
| 5,968,150 | A | * | 10/1999 | Kametani | 710/100 |
| 6,049,847 | A | * | 4/2000 | Vogt et al. | 710/309 |
| 6,161,168 | A | * | 12/2000 | Kametani | 711/147 |

(Continued)

FOREIGN PATENT DOCUMENTS

WO    WO 98/15087    4/1998

(Continued)

*Primary Examiner*—Hassan Kizou
*Assistant Examiner*—Hong Sol Cho
(74) *Attorney, Agent, or Firm*—Nixon & Vanderhye P.C.

(57) ABSTRACT

The present invention provides a data processing apparatus and slave interface mechanism for controlling access to a slave logic unit by a plurality of master logic units. The data processing apparatus comprises a first bus for coupling a first master logic unit with a plurality of slave logic units to enable the first master logic unit to issue a first transfer request to any of said slave logic units, and a second bus for coupling a second master logic unit with a subset of said plurality of slave logic units to enable the second master logic unit to issue a second transfer request to any of the slave logic units in the subset. A slave interface mechanism is then associated with each slave logic unit in the subset and comprises switching logic arranged to connect either the first bus or the second bus to the corresponding slave logic unit to enable either the first transfer request or the second transfer request to be routed to that slave logic unit. By this approach, unrelated transfer requests can be processed in parallel.

11 Claims, 4 Drawing Sheets

U.S. PATENT DOCUMENTS 6,272,579 B1 * 8/2001 Lentz et al. .............. 710/116
6,463,488 B1 * 10/2002 San Juan .................. 710/107
6,496,890 B1 * 12/2002 Azevedo et al. ........... 710/110
6,546,448 B1 * 4/2003 Lai et al. .................. 710/310

FOREIGN PATENT DOCUMENTS

WO    WO 98/15088    4/1998
WO    WO 98/59464    12/1998

* cited by examiner

DATA PROCESSING APPARATUS AND SLAVE INTERFACE MECHANISM FOR CONTROLLING ACCESS TO A SLAVE LOGIC UNIT BY A PLURALITY OF MASTER LOGIC UNITS

BACKGROUND OF THE INVENTION

1. Field of the Invention

The present invention relates to a data processing apparatus and slave interface mechanism for controlling access to a slave logic unit by a plurality of master logic units.

2. Description of the Prior Art

A data processing apparatus will typically have a number of logic units that are interconnected via a bus, with data being transferable between the logic unit via the bus. To effect such a transfer, a first logic unit may output a transfer request on to the bus, this transfer request being destined for a second logic unit. The second logic unit will then retrieve the transfer request from the bus and perform an appropriate operation in order to process the transfer request. Logic units that are designed to initiate transfer requests can be referred to as "master" logic units, whilst logic units that are designed to be recipients of such transfer requests can be referred to as "slave" logic units.

Figure 1:
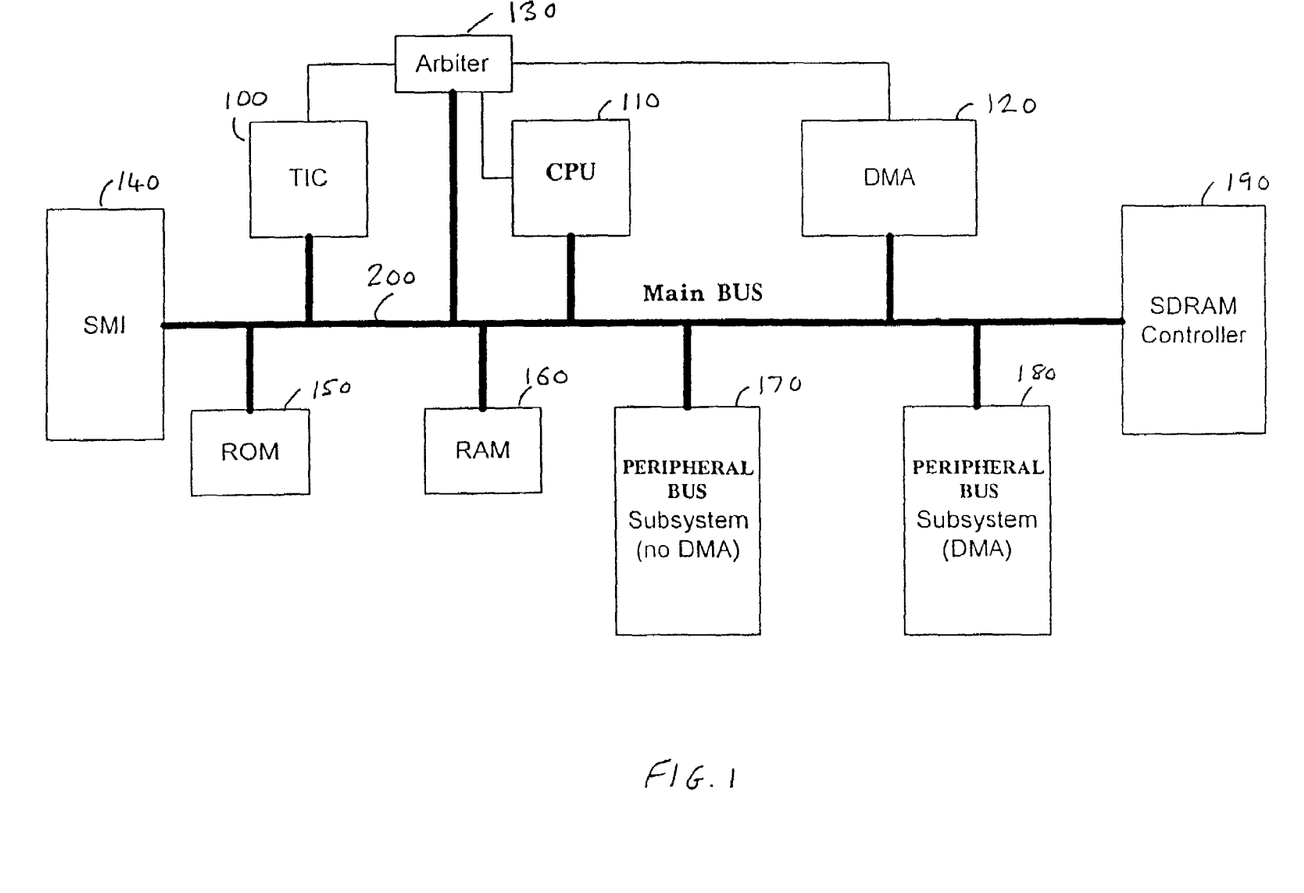
FIG. 1 is a block diagram illustrating a known architecture used in a data processing apparatus to connect a number of master logic units to a number of slave logic units via a bus.

Such a data processing apparatus is illustrated in FIG. 1, where here it may be considered that the data processing apparatus is in the form of a microcontroller chip. The chip has a number of master logic units connected to a main system bus 200, namely a test controller (referred to hereafter as a Test Interface Controller (TIC)) 100, a Central Processing Unit (CPU) 110 and a Direct Memory Access (DMA) controller 120. Due to the fact that bus signals are shared by the logic units connected to the bus, only one of the master logic units may have access to the system bus at any particular instance in time, and hence an arbiter 130 is provided to control access to the system bus 200 by the various master logic units. When a master logic unit wishes to have access to the system bus 200, it issues a bus request signal to the arbiter 130. If only one bus request signal is received by the arbiter 130 at any particular instance in time, it will grant access to the master logic unit that issued that bus request signal. However if more than one bus request signal is received by the arbiter at any particular instance in time, the arbiter is arranged to apply predetermined priority criteria in order to determine which master logic unit should have access to the system bus 200. Of all of the master logic units requesting access to the bus, the arbiter 130 is arranged to grant access to the master logic unit having the highest priority.

In the FIG. 1 example, it can be seen that there are six slave logic units connected to the main system bus 200, namely a Static Memory Interface (SMI) 140 acting as an interface to external SRAM or ROM, an internal ROM memory 150, an internal RAM memory 160, an SDRAM controller 190 acting as an interface to external SDRAM, and two peripheral bus subsystems 170 and 180. The first peripheral bus subsystem 170 is provided for peripherals that do not require DMA, whilst the second peripheral bus subsystem 180 is provided for peripherals that require DMA. As will be appreciated by those skilled in the art, each peripheral bus subsystem will generally consist of a peripheral bus coupled to the main bus 200 via a bridge, with individual peripheral devices then being connected to the peripheral bus. It will also be appreciated by those skilled in the art that the individual peripheral devices connected to the peripheral bus will be slave logic units, but that the entire peripheral bus subsystem can be considered logically as a single slave logic unit connected to the main bus 200.

One characteristic of the FIG. 1 approach is that it allows every master logic unit to access every slave logic unit in the system via a single bus. However, to support this flexibility, the FIG. 1 architecture uses the arbiter to ensure that, when a master logic unit is granted access to the bus, other master logic units requesting the bus have to wait until the current master logic unit finishes its transfer. It will be appreciated that this is a limiting factor on the processing speed of the data processing apparatus.

SUMMARY OF THE INVENTION

Viewed from a first aspect, the present invention provides a data processing apparatus, comprising: a first bus for coupling a first master logic unit with a plurality of slave logic units to enable the first master logic unit to issue a first transfer request to any of said slave logic units; a second bus for coupling a second master logic unit with a subset of said plurality of slave logic units to enable the second master logic unit to issue a second transfer request to any of the slave logic units in the subset; and a slave interface mechanism associated with each slave logic unit in said subset and comprising switching logic arranged to connect either the first bus or the second bus to the corresponding slave logic unit to enable either the first transfer request or the second transfer request to be routed to that slave logic unit.

In accordance with the present invention, it has been realised that in many practical implementations, certain master logic units will only need to access a certain subset of the available slave logic units, and hence there is no need to allow every master logic unit to access every slave logic unit in the system. This fact can be illustrated with reference to the FIG. 1 example discussed earlier.

As will be appreciated by those skilled in the art, during normal operation there will be two master logic units using the main system bus 200, namely the CPU 110 and the DMA controller 120. During normal operation, the DMA controller 120 may be arranged to transfer data between external SDRAM and the DMA-capable peripherals, and hence will be using the slave logic units 180 and 190. The CPU 110 will typically be arranged to fetch its instructions and data mainly from internal memory (ROM/RAM) and external SRAM, in which event it will require access to the slave logic units 140, 150 and 160. It is also possible that the CPU will access data from the external SDRAM via the slave logic unit 190, and indeed the CPU 110 may need to access internal registers and service interrupts on the DMA-capable peripherals via slave logic unit 180.

Hence, it can be seen that whilst the CPU 110 may need access to the slave logic units 180 and 190, it is likely to spend much of its time accessing the slave logic units 140, 150, 160 and possibly 170. Meanwhile, in normal operation, the DMA controller 120 will only wish to access slave logic units 180 and 190. Whilst the arbiter 130 ensures that there is no conflict for access to the slave logic units by granting only one master logic unit access to the main system bus 200 at any one point in time, this does restrict the overall efficiency of the data processing apparatus, since only one transfer request can be processed at a time, even when different master logic units want to access different slave logic units and hence, in reality, there is no conflict problem.

Hence, in accordance with the present invention, rather than providing a single bus for coupling all of the master logic units with all of the slave logic units, an additional bus is provided for coupling at least one of the master logic units with a subset of the plurality of slave logic units. The first bus is then used to couple the plurality of slave logic units with any master logic units that require access to more than just the subset of slave logic units coupled to the second bus, whilst the second bus is preferably used to couple the subset of slave logic units with any master logic units that only require access to that subset of the slave logic units.

Since this arrangement will require that the subset of slave logic units are able to be connected to either the first or second bus, then the present invention provides a slave interface mechanism associated with each slave logic unit in the subset, which comprises switching logic arranged to connect either the first bus or the second bus to the corresponding slave logic unit. By this approach, transfer requests from both master logic units on the first bus and the second bus can be routed to the slave logic unit as and when required. A significant benefit of this approach is that in implementations where one or more master logic units only require access to a subset of the slave logic units, parallel transfers can occur, since such master logic units may access slave logic units within that subset, whilst other master logic units can access other slave logic units.

One issue that arises when at least one of the master logic units is not connected to the first bus, but instead is connected to a second bus, is that the arbitration between the various master logic units becomes more complex. It will be apparent that any arbiter connected to the master logic units on the first bus will not be able to control any master logic unit connected to the second bus, and similarly any arbiter connected to one or more master logic units on the second bus will not be able to control access to slave logic units by master logic units on the first bus. It will be appreciated that to provide a mechanism for the arbiter on the first bus to communicate with any arbiter on the second bus to prevent any conflicting access occurring would be complex. However, in preferred embodiments, this problem is resolved by providing each slave interface mechanism with an arbitration control unit for applying predetermined criteria to control the routing of the first and second transfer requests to the corresponding slave logic unit in the event that the slave logic unit is already processing one of the transfer requests when the other transfer request is issued to the slave logic unit. This provides an effective and simple solution for removing the conflict problems that will otherwise occur as a result of not having all of the various master logic units controlled by a single arbiter.

In the preferred embodiments, the first and second transfer requests are burst transfer requests, each burst transfer request comprising a non-sequential transfer request followed by a number of sequential transfer requests, and the predetermined criteria applied by the arbitration control unit is such that upon issuance of a non-sequential transfer request from one of said master logic units, the slave interface mechanism will defer routing that non-sequential transfer request to the slave logic unit until any burst transfer request already being handled by that slave logic unit has been completed. As will be appreciated by those skilled in the art, a non-sequential transfer request is one in which the address is not related to the previous transfer, whereas a sequential transfer request is one in which the address follows a predetermined incremental relationship to the address of the previous transfer. In preferred embodiments, each master logic unit issues a control signal as part of the transfer request to identify whether the transfer is sequential or non-sequential.

It will be appreciated that the deferring of the non-sequential transfer request may occur in a number of ways, depending on the protocols used in relation to transfer requests. However, in preferred embodiments, the slave logic unit is arranged to issue an acknowledge signal to confirm that a current transfer request has been performed, each master logic unit being arranged to await receipt of the acknowledge signal before issuing a subsequent transfer request, and the arbitration control unit being arranged to withhold the acknowledge signal output to the master logic unit issuing the deferred non-sequential transfer request to ensure that the master logic unit keeps asserting that non-sequential transfer request until the slave logic unit is available to receive it.

The above approach to the issue of arbitration, whereby the first transfer request is allowed to complete before a next first transfer request is handled, can be considered as a passive arbitration approach, since no attempt is made to associate any relative priorities between the various master logic units, and instead the transfer requests are processed on a first come, first served basis. Nevertheless, this passive arbitration approach reduces the complexity of the slave interface mechanism, and would be entirely satisfactory in situations where the maximum latency generated by a burst of transfers is acceptable, and/or the slave performance is maximised by burst transfers (for example, as in an SDRAM controller).

However, in alternative embodiments, a more active arbitration approach may be employed to arbitrate between burst transfer requests. In particular, in one embodiment, the predetermined criteria applied by the arbitration control unit is such that upon issuance of a non-sequential transfer request from one of the master logic units, the slave interface mechanism may route that non-sequential transfer request to the slave logic unit without waiting until any burst transfer request already being handled by that slave logic unit has been completed.

Again, it will be appreciated that the way in which such an arbitration approach may be implemented will vary depending on the protocols used for such transfer requests. However, in preferred embodiments, each master logic unit is arranged to issue as part of each transfer request a control signal indicating the type of transfer request, and the arbitration control unit is arranged to manipulate that control signal prior to it being output to the corresponding slave logic unit to enable a burst transfer request to be split into a number of shorter length burst transfer requests.

In one embodiment, the predetermined criteria specify relative priorities for each master logic unit, and this priority information is used by the arbitration unit to determine upon issuance of a non-sequential transfer request from one of said master logic units whether to interrupt a burst transfer request already being handled by that slave logic unit.

Alternatively, or in addition, the predetermined criteria may specify a maximum length of a burst transfer request, such that if, upon issuance of a non-sequential transfer request from one of said master logic units, a burst transfer request already being handled by that slave logic unit has reached said maximum length, the slave interface mechanism is arranged to route that non-sequential transfer request to the slave logic unit without waiting for the burst transfer request already being handled by that slave logic to complete. It will be appreciated that the maximum length can be any appropriate length, for example one transfer request or many transfer requests.

It will be appreciated that the above active arbitration approach is more suitable when the latency of the longest burst transfer becomes a significant issue, or when the connected slave performance is not adversely hindered by performing shorter burst accesses.

It will also be appreciated by those skilled in the art that the above described arbitration techniques are not the only arbitration techniques that may be employed, and indeed any suitable arbitration approach may be employed, dependent on the implementation.

In preferred embodiments, the slave interface mechanism comprises a buffer for temporarily storing a transfer request issued to the corresponding slave logic unit from one of said master logic units if another transfer request is already being handled by that slave logic unit.

The use of a buffer within the slave interface mechanism can prove useful in a number of situations. For example, in preferred embodiments, a transfer request comprises a first part issued in a first clock cycle and a second part issued in a second clock cycle. Considering the earlier described passive arbitration approach, where the arbitration control unit withholds the acknowledge signal output to the master logic unit issuing the deferred non-sequential transfer request, the buffer can be arranged to store the first part of the non-sequential transfer request whilst the arbitration control unit can be arranged to withhold in the second clock cycle the acknowledge signal output to the master logic unit issuing the deferred non-sequential transfer request. This in effect ensures that the first part of the non-sequential transfer request does not need to be reissued, whilst the second part continues to be asserted until the slave logic unit is available to receive the non-sequential transfer request.

Viewed from a second aspect, the present invention provides a slave interface mechanism for a data processing apparatus in accordance with the first aspect of the present invention, the slave interface mechanism including a first connection for connecting to the first bus, a second connection for connecting to the second bus and a third connection for enabling the corresponding slave logic unit to be coupled to the slave interface mechanism, the slave interface mechanism comprising switching logic arranged to connect either the first bus or the second bus to the corresponding slave logic unit to enable either the first transfer request or the second transfer request to be routed to that slave logic unit.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

Figure 2:
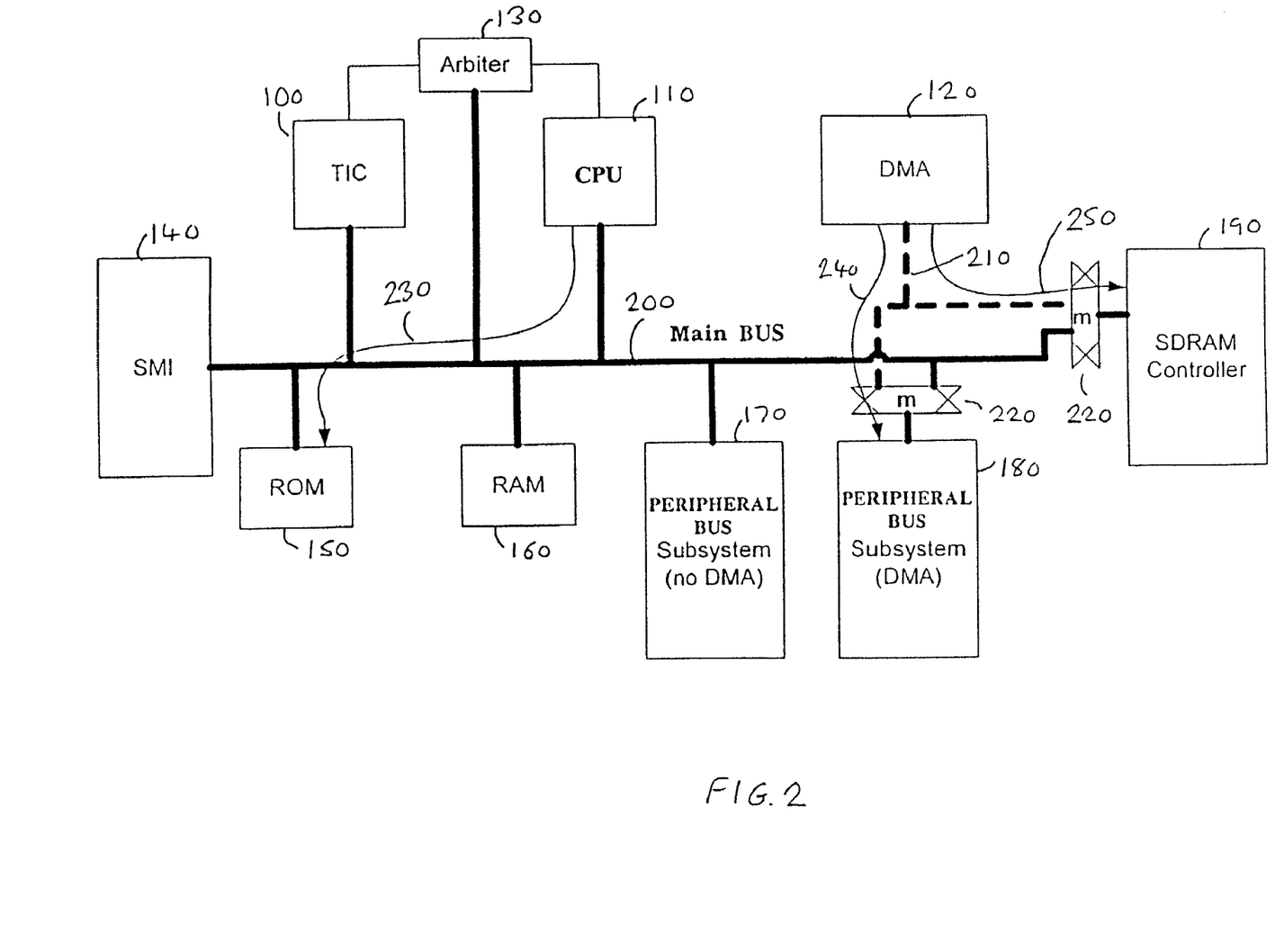
FIG. 2 is a block diagram of a data processing apparatus in accordance with a preferred embodiment of the present invention.

FIG. 2 is a block diagram of a data processing apparatus in accordance with the preferred embodiment of the present invention. For the sake of illustration, this data processing apparatus has the same master logic units and slave logic units as those discussed earlier with reference to FIG. 1, and accordingly like references have been used for those elements in FIG. 2 which are the same as the elements discussed earlier with reference to FIG. 1.

As discussed earlier, it has been realised that certain master logic units will often only need to access a certain subset of the total number of slave logic units provided by the data processing apparatus. For example, as mentioned earlier with reference to FIG. 1, the DMA controller 120 will only need to use the peripheral bus subsystem 180 and the SDRAM controller 190 in order to enable it to carry out its normal operation of transferring data between external SDRAM and the DMA-capable peripherals.

Hence, in accordance with preferred embodiments of the present invention, rather than physically connecting the DMA controller 120 to all of the slaves in the system, the data processing apparatus of preferred embodiments is arranged to provide for the DMA controller 120 to only be coupled to the peripheral bus subsystem 180 and the SDRAM controller 190. To do this, a second main bus 210 is provided in addition to the first main bus 200, and the DMA controller 120 is only connected to the second main bus 210.

Since the peripheral bus subsystem 180 and the SDRAM controller 190 need to be accessible by both master logic units connected to the first main bus 200 and the DMA controller 120 connected to the second main bus 210, then there is a requirement for the peripheral bus subsystem 180 and the SDRAM controller 190 to be connectable to both the first and the second main buses 200, 210. To achieve this, a slave interface mechanism 220 is provided for each of these two slave logic units to act as an interface between the two main buses 200, 210 and the corresponding slave logic unit. In FIG. 2, the slave interface mechanism 220 is shown as a two-way multiplexer module, whose basic function is to connect either the first main bus 200 or the second main bus 210 to the corresponding slave logic unit as required to enable whichever master logic unit needs access to the corresponding slave logic unit to route transfer requests to that slave logic unit. In preferred embodiments, the slave interface mechanism 220 will have a default position, for example the second bus 210 may be connected to the slave logic unit unless a transfer request from a master logic unit on the first main bus is issued.

One of the main advantages of this architecture is that parallel transfers can now occur, for example, as marked by the arrows 230 and 240, 250 shown in FIG. 2. As illustrated by those arrows, the CPU 110 may fetch instructions from ROM whilst the DMA controller 120 is servicing a peripheral providing data from external SDRAM via the SDRAM controller 190. It will be appreciated that this approach can yield significant performance benefits over the architecture illustrated in FIG. 1, in situations where certain of the master logic units only require access to a subset of the total slave logic units provided by the data processing apparatus.

Given FIG. 2, it will be appreciated that there is no requirement that only two main buses be provided, but instead if a further master logic unit can be identified which only requires access to a different subset of the slave logic units, then a further main bus may be provided to connect that master logic unit to the corresponding subset of slave logic units, each slave logic unit in that subset also having associated therewith a slave interface mechanism 220 to switch between the relevant main buses as required.

Indeed, it will be appreciated that the particular subsets identified do not need to be entirely distinct, and instead one or more of the slave logic units may be included within two or more subsets. In that event, it will be appreciated that the slave interface mechanism 220 associated with any such slave logic unit will need to provide an n-way multiplexing function rather than merely a two-way multiplexing function, dependent on the number of buses that need to be connectable to the slave logic unit.

In addition, it will be appreciated that there is no restriction as to the number of master logic units that may be connected to any particular main bus. In FIG. 2, there are two master logic units 100, 110 connected to the first main bus 200 and only one master logic unit 120 connected to the second main bus 210. However, it is envisaged that a different number of master logic units may be connected to the first main bus, or to the second main bus, and so, for example, a plurality of master logic units may be connected to the second main bus 210 if each of those master logic units only requires access to the slave logic units 180, 190 in the subset. Typically, if more than one master logic unit is connected to the second main bus 210, it is envisaged that an arbiter would be provided to arbitrate between the various master logic units connected to that bus. The arbiter would then work in a standard manner, arbitrating between the various bus request signals issued by the master logic units connected to that bus.

As will be apparent to those skilled in the art, a significant advantage of the slave interface mechanism 220 illustrated in FIG. 2 is that it can be developed as a standard module, and hence can be instantiated in a design as many times as needed, depending on the number of slave logic units identified within any particular subset. This hence allows the circuit designer a great deal of flexibility in the way in which the data processing apparatus is constructed. It will also be appreciated that the standard modules may be chained together to provide for more than two main buses to be connectable to a particular slave logic unit.

Figure 3:
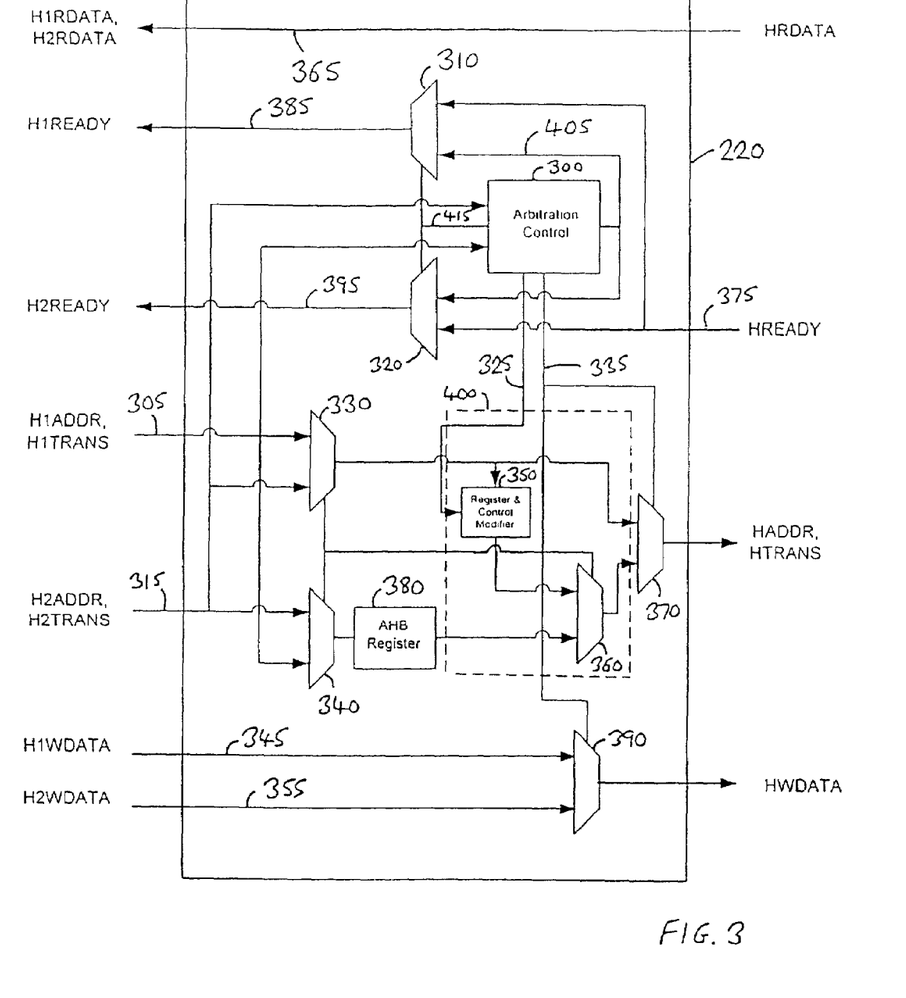
FIG. 3 is a block diagram illustrating the construction of a slave interface mechanism in accordance with preferred embodiments of the present invention.

A more detailed description of the slave interface mechanism and its function in accordance with a preferred embodiment of the present invention will now be provided with reference to FIG. 3. With regard to the naming convention for the signals in FIG. 3, and indeed in FIG. 4 to be discussed later, H1xxx signals correspond to those issued and received by master 1, which for the sake of example we will assume to be the CPU 110 in FIG. 2, H2xxx correspond to signals issued and received by master 2, which we will assume for example to be DMA controller 120 in FIG. 2, and Hxxx signals are the signals received and issued by the slave logic unit.

As can be seen from FIG. 3, the slave interface mechanism is arranged to receive address and control signals from the CPU 110 over path 305 and write data from CPU 110 over path 345. Similarly, the slave interface mechanism 220 is arranged to receive address and control signals from the DMA controller 120 over path 315, and write data from the DMA controller 120 over path 355. In preferred embodiments, the control signal takes the form of a HTRANS signal identifying the type of transfer.

As is clear from FIG. 3, the address and control data received on paths 305 and 315 is passed to both multiplexer 330 and multiplexer 340, and also to the arbitration control block 300. Dependent on predetermined criteria applied by the arbitration control block 300, the arbitration control block 300 is arranged to issue mux control signals over path 335 to multiplexers 330, 340 to control which master's address and control signals are output by each multiplexer 330, 340.

As mentioned earlier, the responsibility for arbitrating between different master logic units connected to the same main bus is still performed by the arbiter 130, rather than by the slave interface mechanism, and accordingly the arbiter will be responsible for receiving the bus request signals from any particular master on a given bus, and for issuing grant signals to individual masters as they are granted access to their associated bus. In the example of FIG. 2, where only one master logic unit 120 is connected to the second main bus 210, an arbiter is not actually required, and instead the relevant input of the master logic unit 120 that would typically receive the grant signal from the arbiter is arranged to be permanently asserted, such that the DMA controller 120 has in effect been permanently granted access to the second main bus 210.

Since the primary responsibility for deciding which master logic unit gains access to the bus on which it is connected is still provided by the arbiter, the slave interface mechanism does not need to consider the bus request signals issued by each master logic unit, and instead merely needs to handle the arbitration of access to its corresponding slave logic unit in the event that a transfer request from one master logic unit on one of the buses is issued whilst another transfer request from a master logic unit on the other main bus is already being handled by the slave logic unit.

In preferred embodiments, two alternative ways to provide such arbitration are envisaged for the slave interface mechanism. A first approach is a passive arbitration approach, where arbitration is performed between burst transfers only. This arbitration technique is preferred on systems where the maximum latency generated by a burst transfer is acceptable and/or the slave performance is maximised by burst transfers (like, for example, in an SDRAM controller). The mechanism can be described as follows.

Whenever a non-sequential transfer request is initiated by one of the master logic units, the slave interface mechanism will multiplex its signals on to the slave logic unit, providing that no other master logic unit is accessing the slave. Hence, with reference to FIG. 3, in this instance, only one of the masters will be outputting address and control data, and hence only one of the inputs of the multiplexers 330, 340 will be receiving input address and control data. Accordingly, the arbitration control unit 300 issues a mux control signal over path 335 to cause the multiplexer 330 to output the valid address and control data, whilst the multiplexer 340 is instructed to output the data on the other input, i.e. null data. In this passive arbitration scheme the circuitry within block 400 is not required, and instead the outputs for multiplexers 330 and 340 are provided directly to the inputs of multiplexer 370 (in the case of multiplexer 340, this occurs via register 380, whose purpose will be described later). The multiplexer 370 also receives a mux control signal over path 335 from arbitration control unit 300, instructing it to output the input from multiplexer 330 to the slave logic unit.

If a master logic unit is already accessing the slave logic unit when a non-sequential transfer is initiated by another of the master logic units, as is apparent from FIG. 3, the address and control data from the master logic unit initiating the non-sequential transfer (hereafter referred to as the deferred master logic unit) will be output by multiplexer 340 to the register 380, but the multiplexer 370 will not cause that control and address data to be output to the slave logic unit at the current time. In this scenario, the arbitration control block 300 will de-assert an acknowledge signal returned to the deferred master logic unit, which has the effect of causing that deferred master logic unit to continue to assert the non-sequential transfer. Once the slave logic unit has finished handling the current burst transfer request, it can be passed the deferred non-sequential transfer request for processing, and accordingly the acknowledgement signal is then re-asserted by the arbitration control block 300 to enable the deferred master logic unit to stop asserting the deferred non-sequential transfer request.

The manner in which this occurs will now be illustrated with reference to the top half of FIG. 3. In preferred embodiments, each transfer request is issued in two clock cycles, in the first clock cycle the address and control data being issued, and in the second clock cycle the corresponding data being issued (from the master in the event of a write, or the slave in the event of a read). The slave logic unit will issue an acknowledge signal, referred to hereafter as an HREADY signal during the second clock cycle when the request has been processed. This HREADY signal is then passed back to the master logic unit, to confirm that the master logic unit can continue with the next transfer request, and hence can transition its address, control and data signals during the next clock cycle. As can be seen from FIG. 3, the HREADY signal returned from the slave over path 375 is passed to multiplexers 310 and 320, which also receive a further input from the arbitration control block 300 over the path 405. The arbitration control block 300 is then able to issue control signals over path 415 to multiplexers 310, 320 to determine which of the two inputs each multiplexer should output.

Hence, assuming the DMA controller 120 (master 2) is already in the middle of a burst transfer write request when the CPU 110 (master 1) initiates a burst transfer request, then the DMA controller's address and control data received over path 315 will be routed via multiplexers 330 and 370 to the slave logic unit, whilst its write data received over path 355 will be routed via multiplexer 390 to the slave logic unit, the write data for any particular transfer request within the burst being provided one clock cycle after the corresponding address and control data. Each time the slave logic unit receives the write data, then in the same clock cycle it will assert the HREADY signal over path 375, and the arbitration control block 300 will cause the multiplexer 320 to output that HREADY signal directly over path 395 back to the DMA controller 120, thereby enabling the DMA controller 120 to continue with the burst transfer.

When the CPU 110 issues its burst transfer request (starting with a non-sequential transfer request), this will be received over path 305 and routed via multiplexer 340 to the register 380. At this stage, the register 380 will then buffer the address and control data for the non-sequential transfer request issued by the CPU 110. During the next clock cycle, the CPU 110 will issue the corresponding data for that non-sequential transfer request, and will also issue the address and control data for the next transfer request, typically a sequential transfer request. However, during this clock cycle, the arbitration control logic 300 will instruct the multiplexer 310 over path 415 to select the signal output by the arbitration control block 300 over path 405, this being a de-asserted version of the HREADY signal. Accordingly, the de-asserted version of the HREADY signal is output over path 385 back to the CPU 110, and will prevent the CPU 110 from driving any new signals on to the main bus 200 during the next clock cycle. Indeed, the CPU 110 will only be able to drive new signals on to the bus in the cycle after it receives an asserted HREADY signal.

Once the burst transfer request from the DMA controller has completed, the address and control data for the CPU's non-sequential transfer request will be output from register 380 via multiplexer 370 to the slave logic unit, the arbitration control block 300 sending an appropriate mux control signal to the multiplexer 370 over path 335. In the next clock cycle, the write data pertaining to that non-sequential transfer request will be output via multiplexer 390 to the slave logic unit, and at the same time the arbitration control block 300 will instruction the multiplexer 310 to output the asserted HREADY signal over path 385 to the CPU 110. This will enable the CPU to drive new signals on to the bus in the next clock cycle, and hence the CPU 110 is now free to continue with its burst transfer.

Read requests occur in a similar manner to that described above for write requests, with the read data typically being returned over path 365 in the clock cycle following issuance of the corresponding address and control data. Again, the HREADY signal is asserted each time the read data is returned to enable the corresponding master logic unit to continue with the next transfer request, and the arbitration control unit 300 can then manipulate the HREADY signal in exactly the same way to in effect defer a non-sequential transfer read request from one of the master logic units, whilst another transfer request is already being handled by the slave logic unit.

An alternative to the passive arbitration approach discussed above, is to provide a more active arbitration approach, where it is possible for the slave interface mechanism to switch between the transfer requests of different masters without waiting for the end of a burst transfer. However, to enable this to occur, the arbitration control block 300 also needs to have the capability to modify the control signals received from the master logic units, and this ability may be provided by the logic elements within the box 400 of FIG. 3.

In preferred embodiments, as mentioned above, when issuing a transfer request, each master logic unit issues a control signal (hereafter referred to as an HTRANS signal) indicating the type of transfer request e.g. non-sequential, sequential or idle (idle in effect meaning no transfer). A burst transfer begins with a non-sequential transfer request, and is followed by a number of sequential transfer requests. The occurrence of a subsequent non-sequential transfer request or an idle transfer request indicates the end of the burst.

In preferred embodiments, to allow for such active arbitration, a register and control modifier block 350 is provided which is controlled by the arbitration control block 300 over path 325. When instructed by the arbitration control block 300 over path 325, the register and control modifier 350 is able to store the address information output by the multiplexer 330, and a modified version of the HTRANS signal output from the multiplexer 330.

Hence, as an example, if the CPU 110 (master 1) is part way through a burst transfer when DMA controller 120 (master 2) issues a non-sequential transfer request, the H2ADDR and H2TRANS signals from the DMA controller over path 315 are routed via multiplexer 340 to register 380. In the following cycle, the arbitration control block 300 will instruct multiplexer 320 to output a de-asserted version of the HREADY signal over path 395 to the DMA controller 120 to indicate that the transfer request has not yet completed.

Assuming the active arbitration scheme is such that the DMA controller should be granted access to the slave logic unit in preference to the CPU, then when the current CPU transfer request terminates, as signified by an HREADY asserted signal being output to the CPU over path 385, the arbitration control block 300 will at the same time indicate to the register and control modifier 350 over path 325 that the H1ADDR and H1TRANS signals currently being output from multiplexer 330 should be stored, but that the H1TRANS signal should be modified to indicate a non-sequential transfer. This needs to be done at this stage, since at the end of this clock cycle, those particular H1ADDR and H1TRANS signals will stop being output by the CPU.

In the following cycle, the arbitration control block 300 will cause the H1READY signal output over path 385 to be de-asserted to indicate to the CPU that the current transfer has not completed (i.e. that corresponding to the H1ADDR and H1TRANS (modified) signals stored in register and control modifier 350).

Meanwhile, the address and control data for the DMA controller's non-sequential transfer request are output to the slave logic unit from register 380 via multiplexers 360 and 370. In the next clock cycle, that transfer request will complete, and accordingly an asserted H2READY signal will be output over path 395 to the DMA controller. As the DMA controller now has access to the slave logic unit, the address and control signals for its transfer requests subsequent to the first one stored in register 380 will be routed via multiplexers 330 and 370 to the slave logic unit.

When the DMA controller's burst transfer has completed, the CPU 110 is again given access to the slave logic unit. In the first cycle, the H1ADDR and modified H1TRANS signals stored in register and control modifier 350 are output to the slave logic unit via multiplexers 360 and 370, whilst in subsequent clock cycles the address and control data for subsequent CPU transfer requests will be routed directly via multiplexers 330 and 370 to the slave logic unit.

This active arbitration approach is suitable when the latency of the longest burst transfer becomes a significant issue, or when the connected slave performance is not hindered by performing shorter burst accesses. It enables long burst transfers to be split into smaller ones as and when required, and indeed it is possible when using this approach to split burst transfers into a sequence of single transfers.

It will be appreciated that the relative priorities of the various master logic units are not fixed, and instead may be set dependent on the system architecture to provide appropriate arbitration by the arbitration control block 300. In addition, as mentioned earlier, the definition of a maximum length burst can be used to control the active arbitration in addition to any relative priorities assigned to the master logic units.

Having described the logic of FIG. 3 in detail, an example of the timing of the various signals in the case of the passive arbitration approach will now be discussed with reference to FIG. 4.

Figure 4:
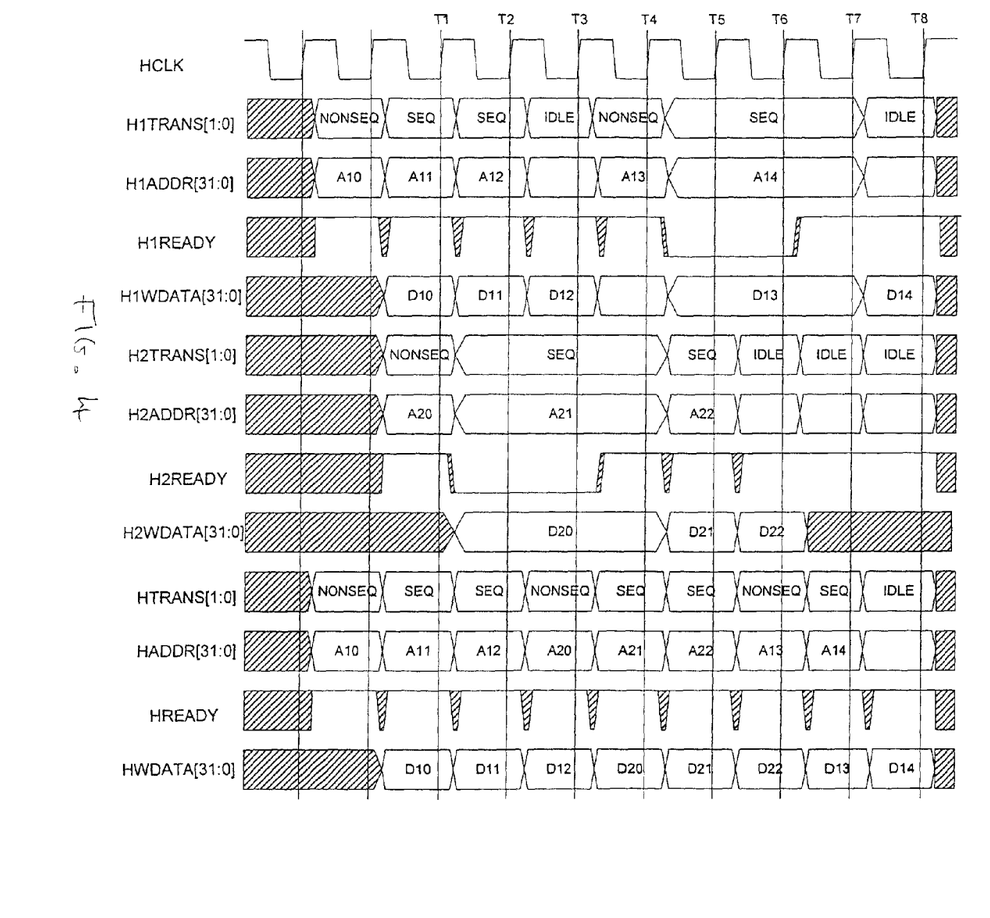
FIG. 4 is a timing diagram indicating the relative timings of certain signals received and issued by the slave interface mechanism in accordance with preferred embodiments of the present invention.

As can be seen in the example of FIG. 4, master 1 initially has access to the slave logic unit and is issuing a burst transfer request consisting of a non-sequential transfer request followed by two sequential transfer requests. At time T1, the non-sequential transfer request has completed, since the write data D10 has been passed out to the slave logic unit, and the slave logic unit has issued an HREADY signal which has been passed on to master 1 as the H1READY signal. Similarly, at time T2 and T3, respectively, the two sequential transfer requests for addresses A11 and A12 have been completed, in that the corresponding data D11 and D12 has been received by the slave, and an HREADY signal has been acknowledged back to master 1 via the H1READY signal.

However, whilst the burst transfer from master 1 was taking place, master 2 also initiated a burst transfer request, and in particular at time T1 a non-sequential transfer request is issued by master 2. Since this non-sequential transfer from master 2 cannot be output directly to the slave logic unit, since it is already handling master 1's burst transfer, the H2TRANS and H2ADDR signals are stored in register 380 at time T1. In addition, by time T2, the arbitration control block 300 will have caused the multiplexer 320 to de-assert H2READY as output over path 395. Hence, this causes the master 2 to continue outputting during the next clock cycle the write data D20, and indeed the control and address data for the next sequential transfer. Since the H2READY signal continues to be de-asserted at time T3, then master 2 also continues to assert the signals into the following clock cycle.

As can be seen from FIG. 4, once all of the address and control data for master 1's burst transfer have been passed to the slave, the address and control data stored in register 380 are then output to the slave logic unit at time T3, with the corresponding write data then being output to the slave at time T4. Accordingly, at time T4, the H2READY signal can be re-asserted to enable master 2 to continue with its sequential transfer. Hence, the transfers taking place at time T4, T5 and T6 are those issued by master 2.

As can be seen from FIG. 4, master 1 then initiates a further burst transfer request with the issuance of a non-sequential transfer request at time T4. However, at this time, the slave logic unit is busy handling the burst transfer from master 2, and accordingly the address and control data from master 1 issued at time T4 are buffered in register 380. Then, in a similar manner to that discussed earlier with reference to master 2, the arbitration control block 300 causes the H1READY signal to be de-asserted at time T5 and T6 to cause master 1 to continue to assert the write data D13, and indeed the address and control data for the next sequential access. The address and control data buffered in register 380 is then broadcast to the slave logic unit at time T6, since at this time the burst transfer from master 2 has completed. As a result of this, the write data D13 will be provided to the slave at time T7, and accordingly by time T7 the H1READY signal is re-asserted by the arbitration control block 300 to cause the remainder of the burst transfer from master 1 to be issued.

From the above description, it will be appreciated that the data processing apparatus of preferred embodiments of the present invention enables significant improvements in the efficiency of the apparatus, in that non-related transfers can occur in parallel. In particular a first master logic unit may access a first slave logic unit via the first main bus, whilst a second master logic unit may access a second (different) slave logic unit via the second main bus. However, in addition, the first master logic unit is also able to access that second slave logic unit via the first main bus as and when required, and a slave interface mechanism is provided to provide effective switching between the two buses, and arbitration as and when required to manage situations where two or more master logic units are seeking access to the same slave logic unit.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. A data processing apparatus, comprising:
    a first bus for coupling a first master logic unit with a plurality of slave logic units to enable the first master logic unit to issue a first transfer request to any of said slave logic units;
    a second bus for coupling a second master logic unit with a subset of said plurality of slave logic units to enable the second master logic unit to issue a second transfer request to any of the slave logic units in said subset; and
    a slave interface mechanism associated with each slave logic unit in said subset and comprising switching logic arranged to connect either the first bus or the second bus to the corresponding slave logic unit to enable either the first transfer request or the second transfer request to be routed to that slave logic unit.

2. A data processing apparatus as claimed in claim 1, wherein the slave interface mechanism comprises an arbitration control unit for applying predetermined criteria to control the routing of the first and second transfer requests to the corresponding slave logic unit in the event that the slave logic unit is already processing one of the transfer requests when the other transfer request is issued to the slave logic unit.

3. A slave interface mechanism for a data processing apparatus as claimed in claim 1, the slave interface mechanism including a first connection for connecting to the first bus, a second connection for connecting to the second bus and a third connection for enabling the corresponding slave logic unit to be coupled to the slave interface mechanism, the slave interface mechanism comprising switching logic arranged to connect either the first bus or the second bus to the corresponding slave logic unit to enable either the first transfer request or the second transfer request to be routed to that slave logic unit.

4. A data processing apparatus, comprising:
    a first bus for coupling a first master logic unit with a plurality of slave logic units to enable the first master logic unit to issue a first transfer request to any of said slave logic units;
    a second bus for coupling a second master logic unit with a subset of said plurality of slave logic units to enable the second master logic unit to issue a second transfer request to any of the slave logic units in said subset; and
    a slave interface mechanism associated with each slave logic unit in said subset and comprising switching logic arranged to connect either the first bus or the second bus to the corresponding slave logic unit to enable either the first transfer request or the second transfer request to be routed to that slave logic unit, wherein the slave interface mechanism comprises an arbitration control unit for applying predetermined criteria to control the routing of the first and second transfer requests to the corresponding slave logic unit in the event that the slave logic unit is already processing one of the transfer requests when the other transfer request is issued to the slave logic unit, wherein the first and second transfer requests are burst transfer requests, each burst transfer request comprising a non-sequential transfer request followed by a number of sequential transfer requests, and the predetermined criteria applied by the arbitration control unit is such that upon issuance of a non-sequential transfer request from one of said master logic units, the slave interface mechanism will defer routing that non-sequential transfer request to the slave logic unit until any burst transfer request already being handled by that slave logic unit has been completed.

5. A data processing apparatus as claimed in claim 4 wherein the slave logic unit is arranged to issue an acknowledge signal to confirm that a current transfer request has been performed, each master logic unit being arranged to await receipt of the acknowledge signal before issuing a subsequent transfer request, and the arbitration control unit being arranged to withhold the acknowledge signal output to the master logic unit issuing the deferred non-sequential transfer request to ensure that the master logic unit keeps asserting that non-sequential transfer request until the slave logic unit is available to receive it.

6. A data processing apparatus as claimed in claim 5 wherein the slave interface mechanism comprises a buffer for temporarily storing a transfer request issued to the corresponding slave logic unit from one of said master logic units if another transfer request is already being handled by that slave logic unit, and wherein the non-sequential transfer request comprises a first part issued in a first clock cycle and a second part issued in a second clock cycle, the buffer being arranged to store the first part of the non-sequential transfer request, and the arbitration control unit being arranged to withhold in the second clock cycle the acknowledge signal output to the master logic unit issuing the deferred non-sequential transfer request to ensure that the master logic unit keeps asserting the second part of the non-sequential transfer request until the slave logic unit is available to receive it.

7. A data processing apparatus, comprising:
    a first bus for coupling a first master logic unit with a plurality of slave logic units to enable the first master logic unit to issue a first transfer request to any of said slave logic units;
    a second bus for coupling a second master logic unit with a subset of said plurality of slave logic units to enable the second master logic unit to issue a second transfer request to any of the slave logic units in said subset; and
    a slave interface mechanism associated with each slave logic unit in said subset and comprising switching logic arranged to connect either the first bus or the second bus to the corresponding slave logic unit to enable either the first transfer request or the second transfer request to be routed to that slave logic unit, wherein the slave interface mechanism comprises an arbitration control unit for applying predetermined criteria to control the routing of the first and second transfer requests to the corresponding slave logic unit in the event that the slave logic unit is already processing one of the transfer requests when the other transfer request is issued to the slave logic unit, wherein the first and second transfer requests are burst transfer requests, each burst transfer request comprising a non-sequential transfer request followed by a number of sequential transfer requests, and the predetermined criteria applied by the arbitration control unit is such that upon issuance of a non-sequential transfer request from one of said master logic units, the slave interface mechanism may route that non-sequential transfer request to the slave logic unit without waiting until any burst transfer request already being handled by that slave logic has been completed.

8. A data processing apparatus as claimed in claim 7 wherein each master logic unit is arranged to issue as part of each transfer request a control signal indicating the type of transfer request, and the arbitration control unit is arranged to manipulate that control signal prior to it being output to the corresponding slave logic unit to enable a burst transfer request to be split into a number of shorter length burst transfer requests.

9. A data processing apparatus as claimed in claim 7 wherein the predetermined criteria specify relative priorities for each master logic unit, and this priority information is used by the arbitration unit to determine upon issuance of a non-sequential transfer request from one of said master logic units whether to interrupt a burst transfer request already being handled by that slave logic unit.

10. A data processing apparatus as claimed in claim 7 wherein the predetermined criteria specify a maximum length of a burst transfer request, such that if, upon issuance of a non-sequential transfer request from one of said master logic units, a burst transfer request already being handled by that slave logic unit has reached said maximum length, the slave interface mechanism is arranged to route that non-sequential transfer request to the slave logic unit without waiting for the burst transfer request already being handled by that slave logic to complete.

11. A data processing apparatus, comprising:

a first bus for coupling a first master logic unit with a plurality of slave logic units to enable the first master logic unit to issue a first transfer request to any of said slave logic units;

a second bus for coupling a second master logic unit with a subset of said plurality of slave logic units to enable the second master logic unit to issue a second transfer request to any of the slave logic units in said subset; and a slave interface mechanism associated with each slave logic unit in said subset and comprising switching logic arranged to connect either the first bus or the second bus to the corresponding slave logic unit to enable either the first transfer request or the second transfer request to be routed to that slave logic unit, wherein the slave interface mechanism comprises a buffer for temporarily storing a transfer request issued to the corresponding slave logic unit from one of said master logic units if another transfer request is already being handled by that slave logic unit.

* * * * *